(12) United States Patent
Wang et al.

(10) Patent No.: US 9,825,790 B1
(45) Date of Patent: Nov. 21, 2017

(54) ELECTRONIC TOLL COLLECTION RECEIVER AND METHOD FOR IMPROVING RECEIVING PERFORMANCE

(71) Applicant: Beken Corporation, Shanghai (CN)

(72) Inventors: Weifeng Wang, Shanghai (CN); Guodong Wang, Shanghai (CN)

(73) Assignee: BEKEN CORPORATION, Shanghai (CN)

( * ) Notice: Subject to any disclaimer, the term of this patent is extended or adjusted under 35 U.S.C. 154(b) by 0 days.

(21) Appl. No.: 15/378,499

(22) Filed: Dec. 14, 2016

(30) Foreign Application Priority Data

Dec. 8, 2016 (CN) .......................... 2016 1 1122774

(51) Int. Cl.
*H04L 27/06* (2006.01)
*G07B 15/06* (2011.01)

(52) U.S. Cl.
CPC ............ *H04L 27/06* (2013.01); *G07B 15/063* (2013.01)

(58) Field of Classification Search
CPC ......... H04L 27/02; H04L 27/06; H04L 27/08; H04L 27/34; G07B 15/063
USPC ................. 375/316, 320, 324, 346
See application file for complete search history.

(56) References Cited

U.S. PATENT DOCUMENTS

| 6,480,233 | B1 * | 11/2002 | Limberg | H04N 5/21 348/21 |
| 7,336,695 | B1 * | 2/2008 | Hendershot | H04B 1/7143 375/132 |
| 7,929,630 | B2 * | 4/2011 | Okunev | H04L 27/3836 375/259 |
| 2008/0280582 | A1 * | 11/2008 | Su | H03G 3/345 455/297 |
| 2014/0301505 | A1 * | 10/2014 | Miyazaki | H04L 25/067 375/320 |

* cited by examiner

*Primary Examiner* — Siu Lee
(74) *Attorney, Agent, or Firm* — Perkins Coie LLP

(57) ABSTRACT

An electronic toll collection receiver, comprising: an enveloping module configured to envelope an amplitude modulation (AM) signal; an averaging module connected to the enveloping module, configured to obtain an average value of the enveloped AM signal; a direct current blocking module connected to the enveloping module and the averaging module, configured to eliminate the average value from the enveloped AM signal; a comparing module connected to the direct current blocking module, configured to compare the average value and each of amplitude values of the enveloped AM signal; a correcting module connected to the comparing module and the directing current blocking module, configured to correct output values from the comparing module; and a decoder module connected to the correcting module, configured to decode the corrected output values from the correcting module.

10 Claims, 6 Drawing Sheets

ELECTRONIC TOLL COLLECTION RECEIVER AND METHOD FOR IMPROVING RECEIVING PERFORMANCE

CLAIM OF PRIORITY

This application claims priority to Chinese Application number 201611122774.7, entitled "Electronic Toll Collection Receiver and Method for Improving Receiving Performance," filed on Dec. 8, 2016 by Beken Corporation, which is incorporated herein by reference.

TECHNICAL FIELD

The present application relates to a wireless communication system for improving receiving performance, and more particularly, but not exclusively, to an electronic toll collection (ETC) receiver using a Bi-phrase space coding rule (FM0) and modulated by amplitude, for example, an electronic toll collection (ETC) system national standards of PRC GB/T 20851.

BACKGROUND OF THE INVENTION

Generally, a conventional communication system receives signals within a certain distance and outputs demodulated signals without distortion. If the communication system receives weak signals further than the certain distance, it may output distorted signals.

To increase the communication distance and enhance the reliability of communication, an ETC receiver and a method for improving receiving performance may be necessary.

BRIEF DESCRIPTION OF THE INVENTION

According to the embodiment of the invention, a method and an ETC receiver use a correcting module to improve receiving performance.

In an embodiment, the method in an electronic toll collection (ETC) receiver, wherein the ETC receiver comprises: an enveloping module, an averaging module connected to the enveloping module, a direct current blocking module connected to the enveloping module and the averaging module, a comparing module connected to the direct current blocking module, a correcting module connected to the comparing module and the direct current blocking module, and a decoder module connected to the correcting module; the method comprises: enveloping, with the enveloping module, an amplitude modulation (AM) signal; obtaining, with the averaging module, an average value of the enveloped AM signal; eliminating, with the direct current blocking module, the average value from the enveloped AM signal; comparing, with the comparing module, the average value and each of amplitude values of the enveloped AM signal, wherein if the amplitude value is larger than the average value, outputting 1 and if the amplitude value is smaller than the average value, outputting 0; correcting, with the correcting module, output values from the comparing module; and decoding, with the decoder module, the corrected output values from the correcting module.

In another embodiment, the method further comprises: limiting, with an amplitude limiting module connected to the enveloping module, the amplitude values of the AM signal before enveloping the AM signal.

In still another embodiment, the device comprises: an enveloping module configured to envelope an amplitude modulation (AM) signal; an averaging module connected to the enveloping module and configured to obtain an average value of the enveloped AM signal; a direct current blocking module connected to the enveloping module and the averaging module and configured to eliminate the average value from the enveloped AM signal; a comparing module connected to the direct current blocking module and configured to compare the average value and each of amplitude values of the enveloped AM signal, wherein if the amplitude value is larger than the average value, outputting 1 and if the amplitude value is smaller than the average value, outputting 0; a correcting module connected to the comparing module and the direct current blocking module and configured to correct output values from the comparing module; and a decoder module connected to the correcting module and configured to decode the corrected output values from the correcting module.

In still another embodiment, the device further comprises: an amplitude limiting module connected to the enveloping module and configured to limit the amplitude values of the AM signal before enveloping the AM signal.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Various aspects and examples of the invention will now be described. The following description provides specific details for a thorough understanding and enabling description of these examples. Those skilled in the art will understand, however, that the invention may be practiced without many of these details. Additionally, some well-know structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below, however, any terminology intended to be interpreted in any restricted manner will be overtly and specifically defined as such in this Detailed Description section.

Figure 1:
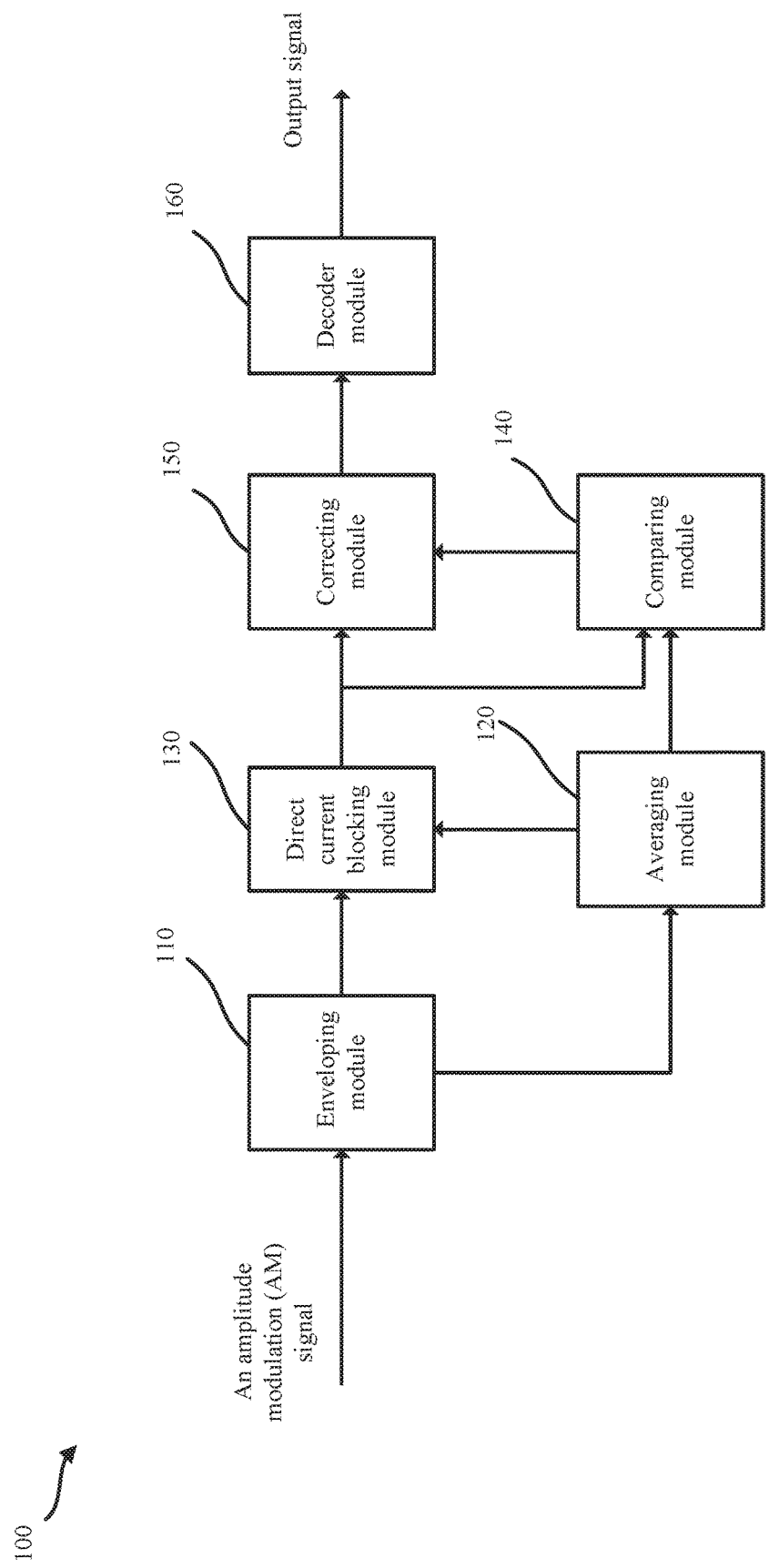
FIG. 1 is a block diagram illustrating an ETC receiver according to an embodiment of the invention.

FIG. 1 is a block diagram illustrating an ETC receiver 100 according to an embodiment of the invention. The ETC receiver 100 comprises an enveloping module 110, an averaging module 120 connected to the enveloping module 110, a direct current blocking module 130 connected to the enveloping module 110 and the averaging module 120, a comparing module 140 connected to the direct current blocking module 130, a correcting module 150 connected to the comparing module 140 and the direct current blocking module 130 and a decoder module 160 connected to the correcting module 150.

In an embodiment, the enveloping module 110 receives an amplitude modulation (AM) signal and envelops the AM signal, wherein the AM signal was coded according to a Bi-phrase space coding rule (FM0) before being transmitted and thus the AM signal has a plurality of FM0 coded symbols and each FM0 coded symbol has two bits. Then, the enveloping module 110 outputs the enveloped AM signal to the averaging module 120 and the direct current blocking module 130. The averaging module 120 receives the enveloped AM signal and obtains an average value of the enveloped AM signal, and then outputs the obtained average value to the direct current blocking module 130 and the comparing module 140. The direct current blocking module 130 receives the enveloped AM signal from the enveloping module 110 and the obtained average value from the averaging module 120 and subtracts the obtained average value from each amplitude value of the enveloped AM signal to eliminate direct current component from the enveloped AM signal. Then, the direct current blocking module 130 outputs each amplitude value without the direct current component to the correcting module 150. The comparing module 140 receives the average value from the averaging module 120 and compares the average value with each amplitude value of the enveloped AM signal, wherein if the amplitude value is larger than the average value, outputting 1 and if the amplitude value is smaller than the average value, outputting 0. Then, the comparing module 140 outputs the compared values, i.e., 0 or 1, to the correcting module 150. The correcting module 150 receives the amplitude values without the direct current component from the direct current blocking module 130 and the compared values from the comparing module 140 and corrects the compared values based on the amplitude values without the direct current component according to correcting rules, as described further below. Then, the correcting module 150 outputs the corrected value to the decoder module 160. The decoder module 160 then decodes the corrected values according to a Bi-phrase space coding rule and outputs the decoded values. Specifically, the decoder module 160 takes two corrected values at one time; and determines whether the two corrected values are same, outputs 1 if the two corrected output values are same; otherwise outputs 0.

In the embodiment, the correcting module 150 corrects the compared values according to correcting rules specifically comprises: setting a first bit of a FM0 coded symbol as an odd symbol and a second bit of the FM0 coded symbol as an even symbol, an amplitude value inputted to the comparing module 140 as rx_slice_in; a compared value outputted from the comparing module 140 as rx_fm0; and a corrected value outputted from the correcting module 150 as rx_fm0_co.

For one odd symbol, the correcting module 150 corrects the symbol according to a correcting rule: firstly, assuming the sequence number of the symbol is k, and then determining: if rx_fm0(k)==rx_fm0_co(k−1), outputting rx_fm0_co(k)=~rx_fm0(k), i.e., flipping the value of rx_fm0(k). For example, if the value of the rx_fm0(k) is 0, the value of rx_fm0_co(k) is 1 and if the value of the rx_fm0(k) is 1, the value of rx_fm0_co(k) is 0. Otherwise, outputting rx_fm0_co(k)=rx_fm0(k).

For one even symbol, the correcting module 150 corrects the symbol according to another correcting rule: firstly, assuming sequence number of the symbol is k, and calculating a condition as follows:

COND1==(rx_fm0(k+1)==rx_fm0(k+2)) && (abs(rx_slice_in(k+1))/2<abs(rx_slice_in(k+2))) && (abs(rx_slice_in(k+1))/2<abs(rx_slice_in(k)))

Wherein, abs(rx_slice_in(k+1))/2 represents taking the absolute value of rx_slice_in(k+1) and obtaining, for example, a half of the value. Then, determining whether the half of value is smaller than the absolute value of rx_slice_in(k+2). In addition, the condition can use other percentage of the value to compare with the absolute value of rx_slice_in(k+2), for example, one-third of the value. Similarly, abs(rx_slice_in(k+1))/2<abs(rx_slice_in(k)) can be replaced with, for example, abs(rx_slice_in(k+1))/3<abs(rx_slice_in(k)).

Then, the correcting module 150 further corrects the even symbol according to the correcting rule to determine: if rx_fm0(k)==rx_fm0(k+1)? If no, outputting rx_fm0_co(k)=rx_fm0(k).

If yes, further to determine rx_fm0(k)==rx_fm0(k−1)?

If no, further to determine whether the COND1 is met and abs(rx_slice_in(k))<abs(rx_slice_in(k+1)). And if the COND1 is not met and the absolute value of rx_slice_in(k) is smaller than the absolute value of rx_slice_in(k+1), outputting rx_fm0_co(k)=~rx_fm0(k), otherwise, outputting rx_fm0_co(k)=rx_fm0(k).

If yes, further to determine rx_fm0(k+1)==rx_fm0(k+2). If yes, further to determine abs(rx_slice_in(k))<abs(rx_slice_in(k+1)), and outputting rx_fm0_co(k)=~rx_fm0(k) if the absolute value of rx_slice_in(k) is smaller than the absolute value of rx_slice_in(k+1), otherwise, outputting rx_fm0_co(k)=rx_fm0(k); if no, further to determine abs(rx_slice_in(k))/2<abs(rx_slice_in(k+1)), and outputting rx_fm0_co(k)=~rx_fm0(k) if a half of the absolute value of rx_slice_in(k) is smaller than the absolute value of rx_slice_in(k+1), wherein the percentage of the absolute value also can be, for example, one-third, otherwise, outputting rx_fm0_co(k)=rx_fm0(k).

Based on the above correcting rules for the odd or even symbol, the correcting module 150 can correct the output value from the comparing module 140 and thus the receiver 100 can increase the accuracy of outputted signals to improve the distance and reliability of communication.

Figure 2:
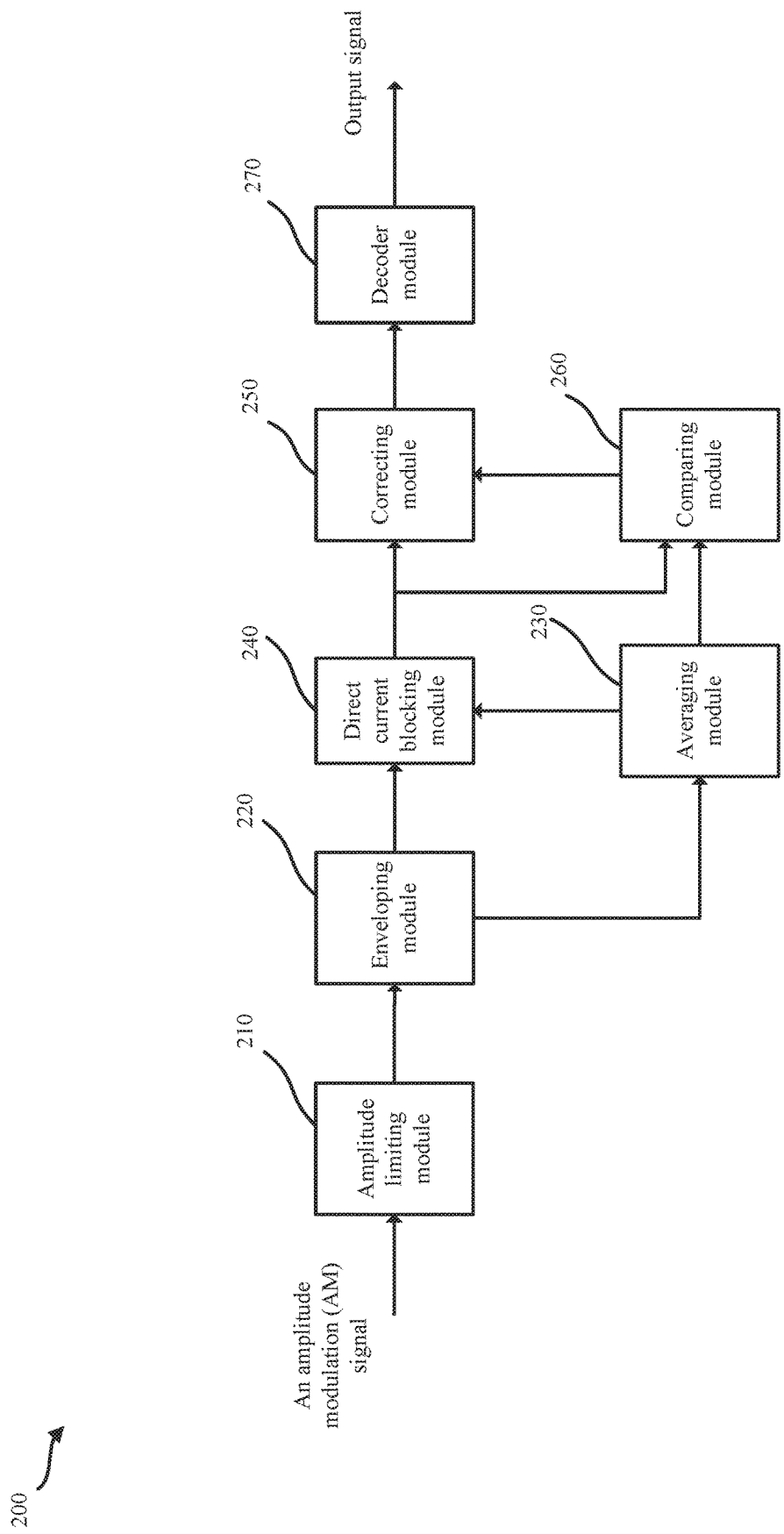
FIG. 2 is a block diagram illustrating an ETC receiver according to another embodiment of the invention.

FIG. 2 is a block diagram illustrating an ETC receiver 200 according to another embodiment of the invention. In the FIG. 2, the ETC receiver 200 further comprises an amplitude limiting module 210 connected to an enveloping module 220 and configured to limit the amplitude values of the AM signal before enveloping the AM signal. The enveloping module 220, an averaging module 230, a direct current blocking module 240, a comparing module 260, a correcting module 250 and a decoder module 270 have similar functions and connections as the enveloping module 110, the averaging module 120, the direct current blocking module 130, the comparing module 140, the correcting module 150 and the decoder module 160 in FIG. 1.

In the embodiment, the amplitude limiting module 210 is configured to output a threshold value if an amplitude value of an AM signal is larger than a threshold value, output the negative threshold value if the amplitude value is smaller than a negative threshold value, and output the amplitude value otherwise, wherein the threshold value is a positive value and can be determined according to different receiving requirements of different ETC receivers. Limiting the amplitude values of the AM signal in the amplitude liming module 210 helps the correcting module 250 to obtain more accurate correction conditions and thus can further increase the accuracy of outputted signals for the receiver 200.

Figure 3:
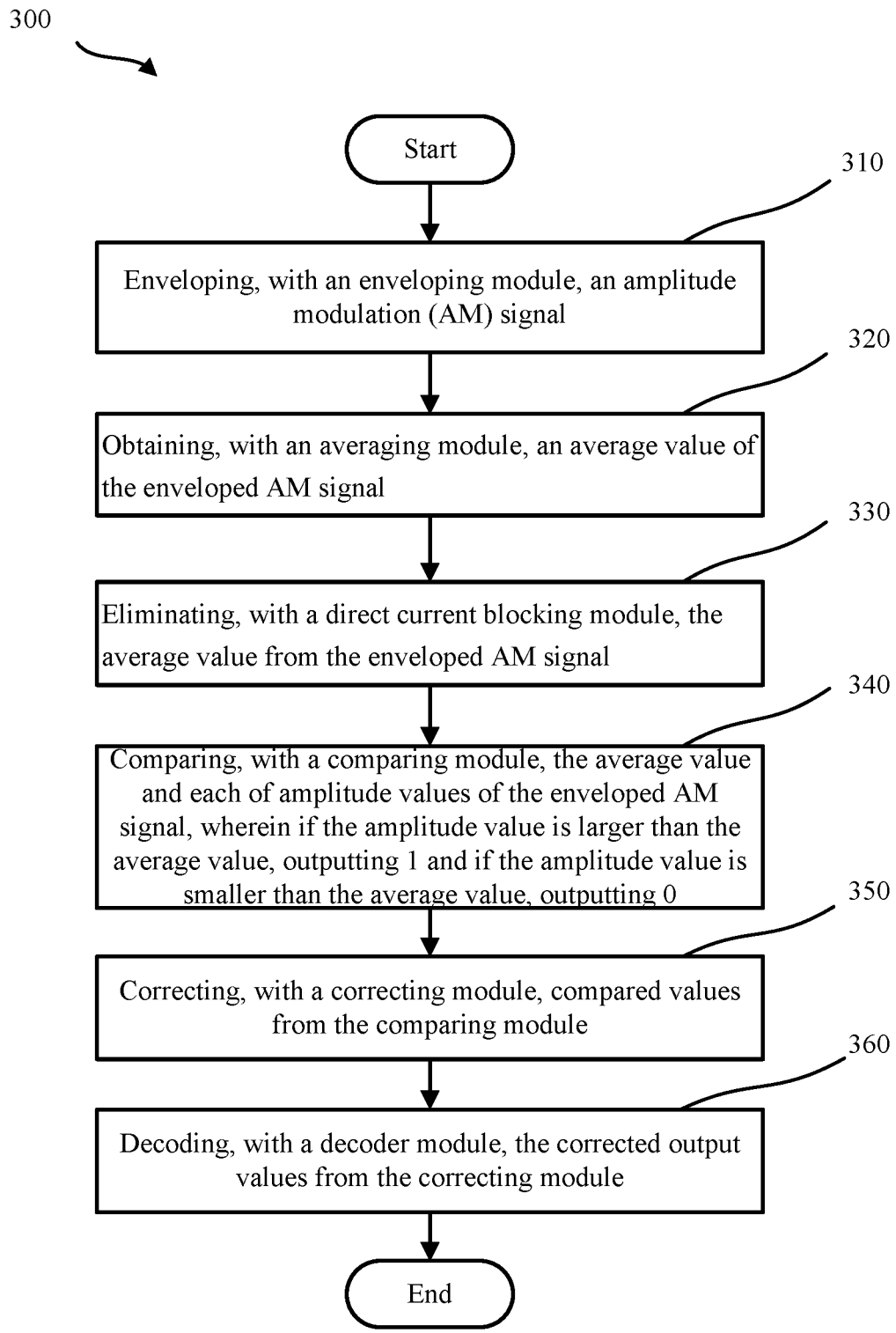
FIG. 3 is a flowchart illustrating a method for improving receiving performance in an ETC receiver according to an embodiment of the invention.

FIG. 3 is a flowchart illustrating a method 300 for improving receiving performance in an ETC receiver according to an embodiment of the invention. As shown in FIG. 3, the method 300 comprises enveloping (310), with an enveloping module, an amplitude modulation (AM) signal, wherein the AM signal was coded according to the Bi-phrase space coding rule (FM0) before being transmitted and thus the AM signal has a plurality of FM0 coded symbol and each FM0 coded symbol has two bits; obtaining (320), with an averaging module, an average value of the enveloped AM signal; eliminating (330), with a direct current blocking module, the average value from the enveloped AM signal, that is, subtracting the obtained average value from each of amplitude values of the enveloped AM signal to obtain amplitude values without the direct current component; comparing (340), with a comparing module, the average value and each of amplitude values of the enveloped AM signal, wherein if the amplitude value is larger than the average value, outputting 1 and if the amplitude value is smaller than the average value, outputting 0; correcting (350), with a correcting module, compared values from the comparing module based on the amplitude values without the direct current component according to correcting rules as described further below, and decoding (360), with a decoder module, the corrected output values from the correcting module.

Figure 4:
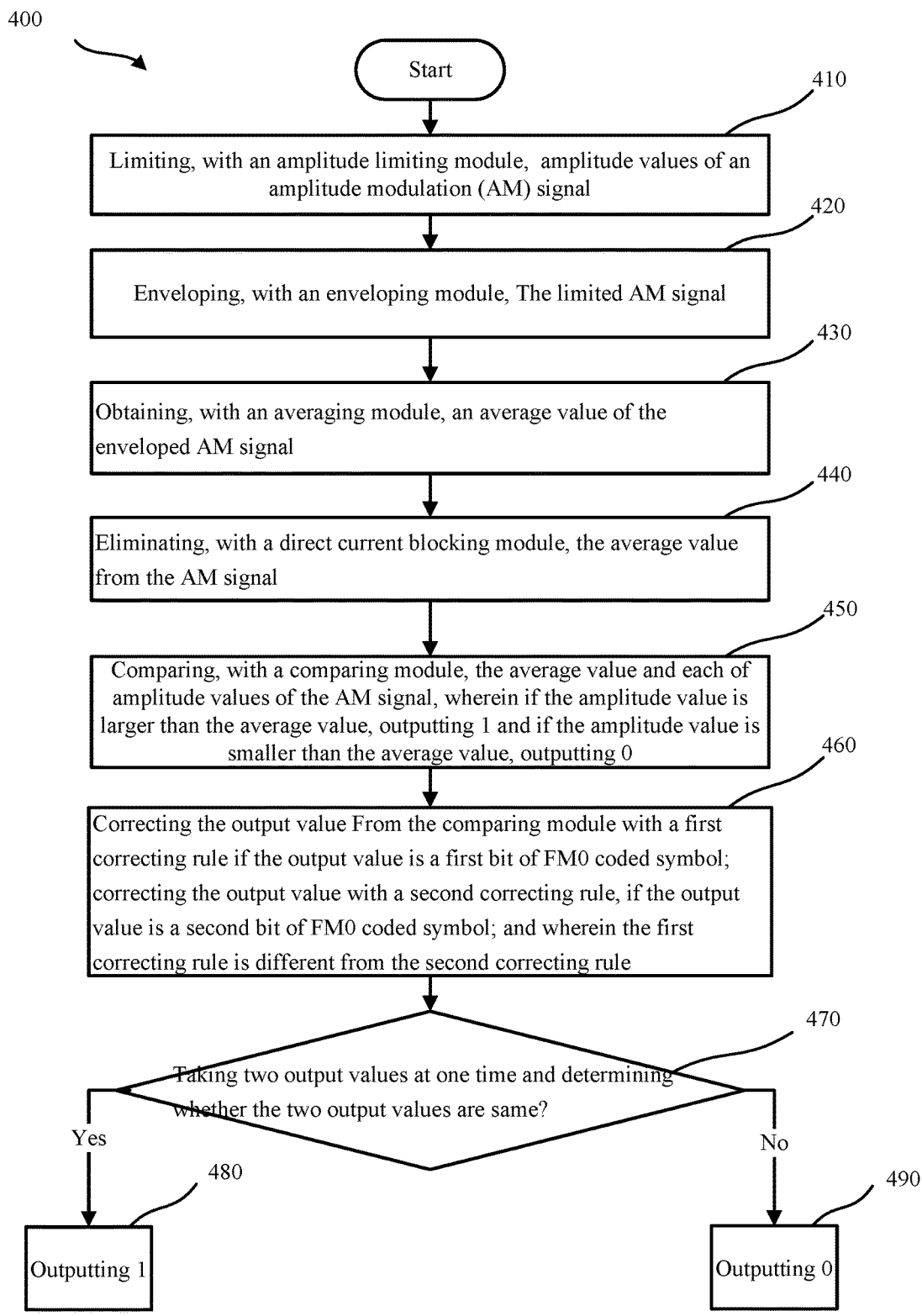
FIG. 4 is a flowchart illustrating a method for improving receiving performance in an ETC receiver according to a further embodiment of the invention.

FIG. 4 is a flowchart illustrating a method 400 for improving receiving performance in an ETC receiver according to a further embodiment of the invention. In the FIG. 4, the blocks 420 to 450 are same as the blocks 310 to 340 in FIG. 3. In an embodiment, before the block 420, the method 400 further comprises limiting (410), with an amplitude limiting module, amplitude values of an amplitude modulation (AM) signal, then the limited AM signal will be enveloped (420) with the enveloping module as the step 310 in FIG. 3. After blocks 420 to 450, the method 400 comprises: correcting (460) the output value with a first correcting rule if the output value is a first bit of FM0 coded symbol, correcting (460) the output value with a second correcting rule, if the output value is a second bit of FM0 coded symbol, and wherein the first correcting rule is different from the second correcting rule; taking (470) two output values at one time and determining (470) whether the two output values are same; outputting (480) 1 if the two values are same, and outputting (490) 0 if not same.

Figure 5:
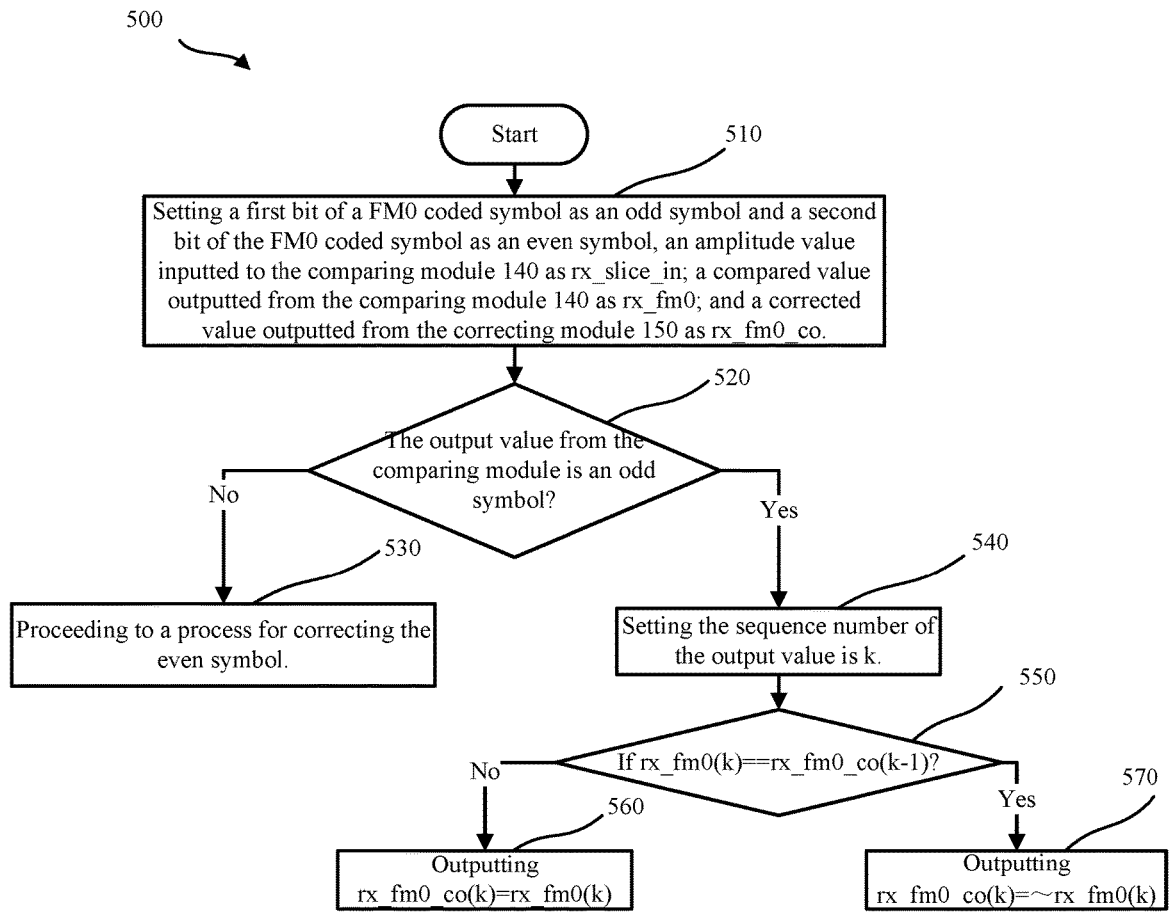
FIG. 5 is a flowchart illustrating a correcting rule of FIG. 4 according to an embodiment of the invention.
Figure 6:
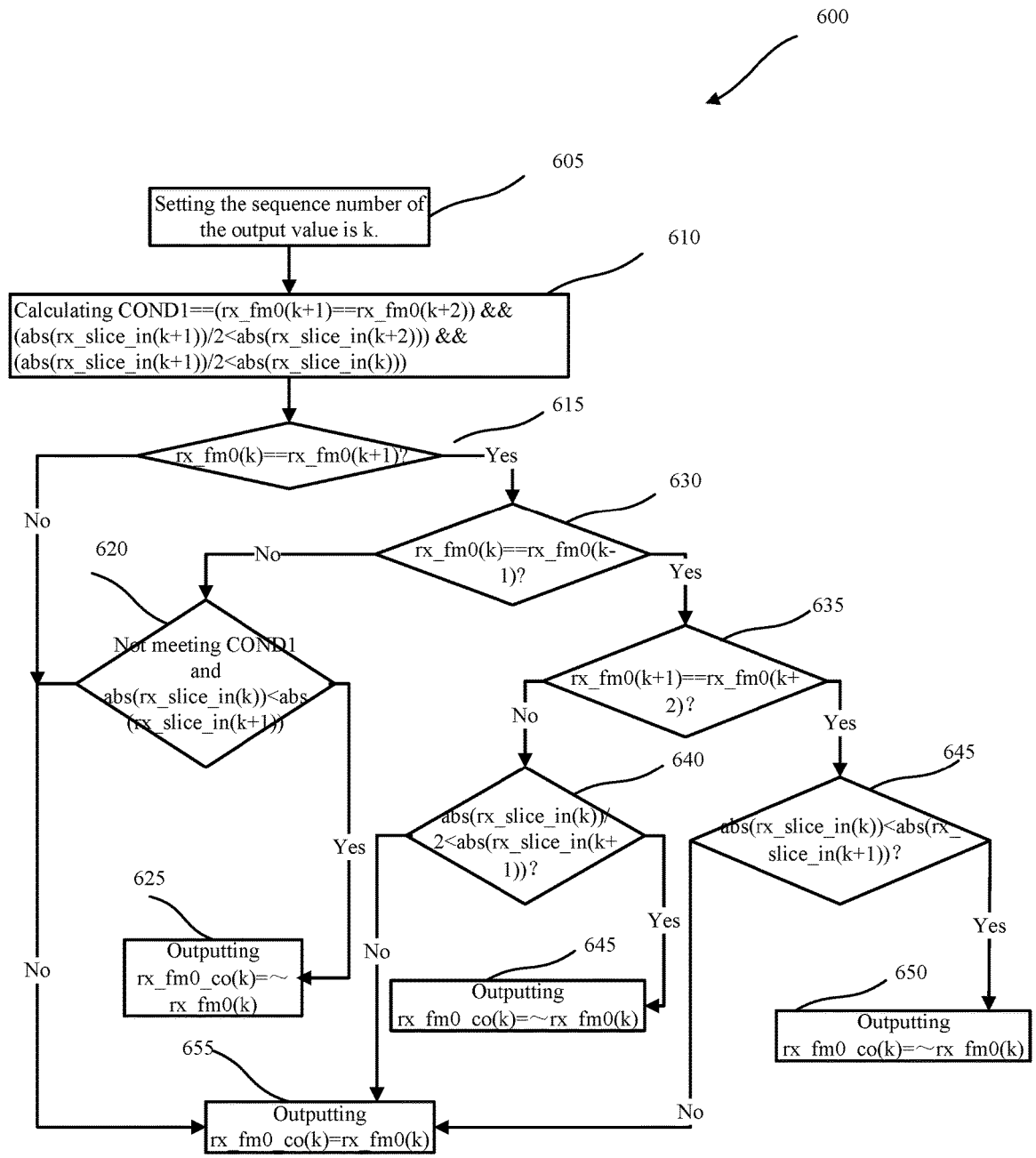
FIG. 6 is a flowchart illustrating another correcting rule of FIG. 4 according to an embodiment of the invention.

In the embodiment, the first correcting rule in the block 460 of FIG. 4 specifically comprises, as shown in FIG. 5, setting (510) a first bit of a FM0 coded symbol as an odd symbol and a second bit of the FM0 coded symbol as an even symbol, an amplitude value inputted to the comparing module 140 as rx_slice_in; a compared value outputted from the comparing module 140 as rx_fm0; and a corrected value outputted from the correcting module 150 as rx_fm0_co. Determining (520) whether the output value from the comparing module is an odd symbol. If the output value from the comparing module is not an odd symbol, then proceeding (530) to a process for correcting the even symbol as shown in FIG. 6, and if the output value from the comparing module is an odd symbol, setting (540) the sequence number of the output value is k. Then, determining (550) rx_fm0 (k)==rx_fm0_co(k−1), and outputting (570) rx_fm0_co(k)=~rx_fm0(k), otherwise outputting (560) rx_fm0_co(k)=rx_fm0(k).

Still in the embodiment, the second correcting rule in the block 460 of FIG. 4 specifically comprises as shown in FIG. 6, setting (605) the sequence number of the output value is k, calculating (610) COND1==(rx_fm0(k+1)==rx_fm0(k+2)) && (abs(rx_slice_in(k+1))/2<abs(rx_slice_in(k+2))) && (abs(rx_slice_in(k+1))/2<abs(rx_slice_in(k))). Wherein abs(rx_slice_in(k+1))/2 represents taking the absolute value of rx_slice_in(k+1) and obtaining, for example, a half of the value. Then, determining whether the half of value is smaller than the absolute value of rx_slice_in(k+2). In addition, the condition can use other percentage of the value to compare with the absolute value of rx_slice_in(k+2), for example, one-third of the value. Similarly, abs(rx_slice_in(k+1))/2<abs(rx_slice_in(k)) can be replaced with, for example, abs(rx_slice_in(k+1))/3<abs(rx_slice_in(k)).

The method 600 further comprises: determining (615) if rx_fm0(k)==rx_fm0(k+1)?

If no, outputting (655) rx_fm0_co(k)=rx_fm0(k).

If yes, further determining (630) rx_fm0(k)==rx_fm0(k−1)?

If no, further determining (620) whether the COND1 is met and abs(rx_slice_in(k))<abs(rx_slice_in(k+1)). And if the COND1 is not met and the absolute value of rx_slice_in(k) is smaller than the absolute value of rx_slice_in(k+1), outputting (625) rx_fm0_co(k)=~rx_fm0(k), otherwise, outputting (655) rx_fm0_co(k)=rx_fm0(k).

If yes, further determining (635) rx_fm0(k+1)==rx_fm0(k+2). If yes, further determining (645) abs(rx_slice_in(k))<abs(rx_slice_in(k+1)), and outputting (650) rx_fm0_co(k)=~rx_fm0(k) if the absolute value of rx_slice_in(k) is smaller than the absolute value of rx_slice_in(k+1), otherwise, outputting (655) rx_fm0_co(k)=rx_fm0(k); if no, further determining (640) abs(rx_slice_in(k))/2<abs(rx_slice_in(k+1)), and outputting (645) rx_fm0_co(k)=~rx_fm0(k) if a half of the absolute value of rx_slice_in(k) is smaller than the absolute value of rx_slice_in(k+1), wherein the percentage of the absolute value also can be, for example, one-third, otherwise, outputting (655) rx_fm0_co(k)=rx_fm0(k).

Based on the above correcting rules for the odd or even symbol, the output value from the comparing module can be corrected and thus the distance and reliability of communication can be improved by increasing the accuracy of outputted signals. In addition, with the limiting (410) in FIG. 4, the correcting module (for example, the correcting module 150 in FIG. 1 or the correcting module 250 in FIG. 2) can obtain more accurate correction conditions and thus the accuracy of outputted signals can be further increased.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural components that do not differ from the literal language of the claims, or if they include equivalent structural components with insubstantial differences from the literal languages of the claims.

What is claimed is:

1. An electronic toll collection (ETC) receiver, comprising:
   an enveloper module configured to envelope an amplitude modulation (AM) signal;
   an averager module connected to the enveloper module and configured to obtain an average value of the enveloped AM signal;
   a direct current blocker module connected to the enveloper module and the averager module and configured to eliminate the average value from the enveloped AM signal;
   a comparator module connected to the direct current blocker module and configured to compare the average value and each of amplitude values of the enveloped AM signal, wherein if the amplitude value is larger than the average value, outputting 1 and if the amplitude value is smaller than the average value, outputting 0;
   a corrector module connected to the comparator module and the direct current blocker module and configured to correct output values from the comparator module; and
   a decoder module connected to the corrector module and configured to decode the corrected output values from the corrector module.

2. The ETC receiver of claim 1, further comprises:
   an amplitude limiter module connected to the enveloper module and configured to limit the amplitude values of the AM signal before enveloping the AM signal.

3. The ETC receiver of claim 2, wherein the amplitude limiter module is further configured to:
   if the amplitude value is larger than a threshold value, output the threshold value;
   if the amplitude value is smaller than a negative threshold value, output the negative threshold value; and
   output the amplitude value otherwise, wherein the threshold value is a positive value.

4. The ETC receiver of claim 1, wherein the corrector module is further configured to:
   if the output value is a first bit of FM0 coded symbol, correct the output value with a first correcting rule;
   if the output value is a second bit of FM0 coded symbol, correct the output value with a second correcting rule;
   wherein the first correcting rule is different from the second correcting rule.

5. The ETC receiver of claim 1, wherein the decoder module is further configured to:
   take two corrected output values at one time; and
   determine whether the two corrected output values are same,
      if the two corrected output values are same, output 1; and
      if the two corrected output values are not same, output 0.

6. A method in an electronic toll collection (ETC) receiver, wherein the ETC receiver comprises:
   an enveloper module,
   an averager module connected to the enveloper module,
   a direct current blocker module connected to the enveloper module and the averager module,
   a comparator module connected to the direct current blocker module,
   a corrector module connected to the comparator module and the direct current blocker module, and a decoder module connected to the corrector module;
   the method comprises:
      enveloping, with the enveloper module, an amplitude modulation (AM) signal;
      obtaining, with the averager module, an average value of the enveloped AM signal;
      eliminating, with the direct current blocker module, the average value from the enveloped AM signal;
      comparing, with the comparator module, the average value and each of amplitude values of the enveloped AM signal, wherein if the amplitude value is larger than the average value, outputting 1 and if the amplitude value is smaller than the average value, outputting 0;
      correcting, with the corrector module, output values from the comparator module; and
      decoding, with the decoder module, the corrected output values from the corrector module.

7. The method of claim 6, further comprises:
   limiting, with an amplitude limiter module connected to the enveloper module, the amplitude values of the AM signal before enveloping the AM signal.

8. The method of claim 7, wherein limiting, with the amplitude limiter module, the amplitude of the AM signal further comprises:
   if the amplitude value is larger than a threshold value, outputting the threshold value;
   if the amplitude value is smaller than a negative threshold value, outputting the negative threshold value; and
   outputting the amplitude value otherwise, wherein the threshold value is a positive value.

9. The method of claim 8, wherein correcting, with the corrector module, the output from the comparator module further comprises:
   if the output value is a first bit of FM0 coded symbol, correcting the output value with a first correcting rule;
   if the output value is a second bit of FM0 coded symbol, correcting the output value with a second correcting rule; and
   wherein the first correcting rule is different from the second correcting rule.

10. The method of claim 9, wherein decoding, with the decoder module, the corrected output values from the corrector module further comprises:
    taking two corrected output values at one time; and
    determining whether the two corrected output values are same,
       if the two corrected output values are same, outputting 1; and
       if the two corrected output values are not same, outputting 0.

* * * * *